United States Patent
Yom et al.

(10) Patent No.: US 8,989,323 B2
(45) Date of Patent: Mar. 24, 2015

(54) SINGLE CABLE INCLUDING MULTIPLE INTERCONNECTIONS BETWEEN TWO RADIO UNITS FOR CROSS POLARIZATION INTERFERENCE CANCELLATION

(71) Applicant: ZTE (USA) Inc., Richardson, TX (US)

(72) Inventors: Dong Hong Yom, Cary, NC (US); Ying Shen, Chapel Hill, NC (US)

(73) Assignee: ZTE (USA) Inc., Richardson, TX (US)

( * ) Notice: Subject to any disclaimer, the term of this patent is extended or adjusted under 35 U.S.C. 154(b) by 0 days.

(21) Appl. No.: 14/345,623

(22) PCT Filed: Sep. 21, 2012

(86) PCT No.: PCT/US2012/056563
§ 371 (c)(1),
(2) Date: Mar. 18, 2014

(87) PCT Pub. No.: WO2013/044022
PCT Pub. Date: Mar. 28, 2013

(65) Prior Publication Data
US 2014/0362959 A1    Dec. 11, 2014

Related U.S. Application Data

(60) Provisional application No. 61/538,727, filed on Sep. 23, 2011.

(51) Int. Cl.
H03D 1/04 (2006.01)
H03D 1/06 (2006.01)
(Continued)

(52) U.S. Cl.
CPC ................ H04B 1/123 (2013.01); H04L 25/08 (2013.01)

USPC ........... 375/346; 375/284; 375/285; 375/350; 375/257; 375/229; 455/63.1; 455/570; 455/296

(58) Field of Classification Search
USPC ......... 375/346, 350, 284, 285, 257, 258, 229, 375/230, 232, 235; 455/63.1, 570, 296
See application file for complete search history.

(56) References Cited

U.S. PATENT DOCUMENTS 6,236,263 B1 * 5/2001 Iwamatsu ...................... 329/306
6,731,704 B1 * 5/2004 Kiyanagi ...................... 375/346

(Continued)

OTHER PUBLICATIONS

ZTE-USA Comm Pursuant to Rule 161.2 and 162EPC, EP12832937. 2, 3 pgs, date Feb. 6, 2014.

(Continued)

Primary Examiner — Phuong Phu
(74) Attorney, Agent, or Firm — Morgan, Lewis & Bockius LLP

(57) ABSTRACT

An outdoor radio communication system comprises a first radio unit, a second radio unit, and a single cable coupling the first radio unit to the second radio unit. Each radio unit includes a downconverter, a radio processor that is communicatively coupled to the downconverter, and a XPIC module. The cable further includes a first twisted-pair of wires for communicatively coupling the first downconverter to the second XPIC module and a second twisted-pair of wires for communicatively coupling the second downconverter to the first XPIC module. The first XPIC module generates a first reference signal using a signal from the second downconverter to cancel cross-polarization interference in an output signal of the first radio processor. Similarly, the second XPIC module generates a second reference signal using a signal from the first downconverter to cancel cross-polarization interference in an output signal of the second radio processor.

20 Claims, 7 Drawing Sheets

(51) Int. Cl.

| | | |
|---|---|---|
| *H03K 5/01* | (2006.01) | |
| *H03K 6/04* | (2006.01) | |
| *H04B 1/10* | (2006.01) | |
| *H04L 1/00* | (2006.01) | |
| *H04L 25/08* | (2006.01) | |
| *H04B 1/12* | (2006.01) | |

(56) References Cited

U.S. PATENT DOCUMENTS

2002/0061752 A1    5/2002    Kurokami

| | | | |
|---|---|---|---|
| 2004/0127179 A1* | 7/2004 | Sasaki | 455/146 |
| 2005/0163271 A1* | 7/2005 | Kaneko | 375/350 |
| 2006/0148431 A1 | 7/2006 | Matsuura | |
| 2008/0285684 A1 | 11/2008 | Shen et al. | |
| 2010/0136916 A1 | 6/2010 | Kawai | |
| 2010/0290552 A1* | 11/2010 | Sasaki | 375/267 |

OTHER PUBLICATIONS

ZTE (USA) Inc., International Search Report and Written Opinion, PCT/US2012/056563, Feb. 27, 2013, 7 pgs.

* cited by examiner

SINGLE CABLE INCLUDING MULTIPLE INTERCONNECTIONS BETWEEN TWO RADIO UNITS FOR CROSS POLARIZATION INTERFERENCE CANCELLATION

PRIORITY CLAIMS AND RELATED APPLICATIONS

This application is a United States National Stage Application filed under 35 U.S.C. §371 of PCT Patent Application Ser. No. PCT/US2012/056563 filed on Sep. 21, 2012, which claims priority to U.S. provisional Patent Application 61/538,727, "Single Cable Including Multiple Interconnections Between Two Radio Units for Cross Polarization Interference Cancellation", filed on Sep. 23, 2011, both of which are hereby incorporated by reference in their entirety.

TECHNICAL FIELD

The present invention relates to a radio communication system with cross polarization interference cancellation and, more particularly, to a single cable including multiple interconnections between the two radio units for cross polarization interference cancellation.

BACKGROUND

The use of an orthogonal pair of a vertically polarized wave and a horizontally polarized wave in the same frequency band can effectively double the radio transmission capacity, compared to a single polarization transmission. However, multipath fading may cause significant cross polarization interference (XPI) and results in some performance degradation at the receive radio units within a radio communication system. To overcome such issue caused by XPI, a receive radio unit may include a cross polarization interference canceller (XPIC). In a conventional XPIC-based radio system including a pair of radio units, the horizontally (or vertically) polarized signal is used for generating an XPIC cancellation signal for the vertically (or horizontally) polarized signal. In general, the other polarization receive signal is used as a reference signal. In this case, at least two interconnections are required for transmitting the polarized signals from one radio unit to the other radio unit and vice versa. The two interconnections may be two separate coaxial cables if the two receive radio units within a radio communication system are separately located.

SUMMARY

One object of the invention is to reduce the number of cables between the two radio units within a radio communication system.

In accordance with some embodiments of the present invention, an outdoor radio communication system comprises a first radio unit, a second radio unit, and a single cable coupling the first radio unit to the second radio unit. The first radio unit includes a first downconverter, a first radio processor that is communicatively coupled to the first downconverter, and a first XPIC module; the second radio unit includes a second downconverter, a second radio processor that is communicatively coupled to the second downconverter, and a second XPIC module. The cable further includes a first twisted-pair of wires for communicatively coupling the first downconverter to the second XPIC module and a second twisted-pair of wires for communicatively coupling the second downconverter to the first XPIC module. The first XPIC module is configured to generate a first reference signal using a signal from the second downconverter to cancel cross-polarization interference in an output signal of the first radio processor. Similarly, the second XPIC module is configured to generate a second reference signal using a signal from the first downconverter to cancel cross-polarization interference in an output signal of the second radio processor.

In accordance with some embodiments of the present invention, an outdoor radio communication system comprises a first radio unit, a second radio unit, and a single cable coupling the first radio unit to the second radio unit. The first radio unit includes a first downconverter, a first IQ demodulator that is communicatively coupled to the first downconverter, a first radio processor that is communicatively coupled to the first IQ demodulator, and a first XPIC module. The second radio unit includes a second downconverter, a second IQ demodulator that is communicatively coupled to the second downconverter, a second radio processor that is communicatively coupled to the second IQ demodulator, and a second XPIC module. The cable includes four twisted-pairs of wires: first and second twisted-pairs of wires for communicatively coupling the first IQ demodulator to the second XPIC module and third and fourth twisted-pairs of wires for communicatively coupling the second IQ demodulator to the first XPIC module. The first XPIC module is configured to generate a first reference signal using a signal from the second downconverter to cancel cross-polarization interference in an output signal of the first radio processor. The second XPIC module is configured to generate a second reference signal using a signal from the first downconverter to cancel cross-polarization interference in an output signal of the second radio processor.

BRIEF DESCRIPTION OF THE DRAWINGS

The accompanying drawings, which are included to provide a further understanding of the invention and are incorporated herein and constitute a part of the specification, illustrate embodiments of the invention and together with the description serve to explain the principles of the invention. Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on many types of radio communication systems.

Figure 1:
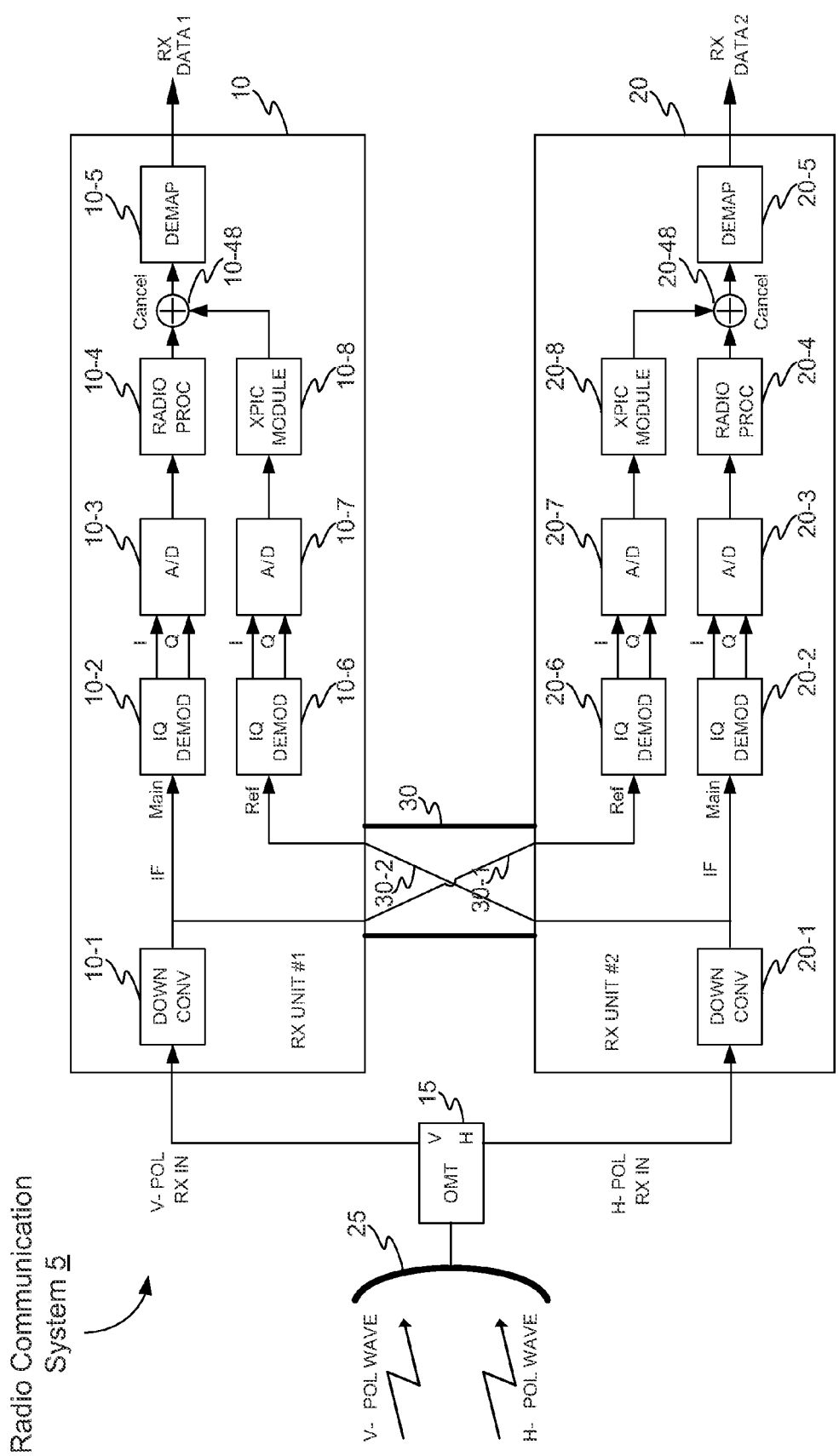
FIG. 1 is a schematic diagram of an exemplary radio communication system including two radio units that are coupled by a single cable according to some embodiments of the present application.

FIG. 1 is a schematic diagram of an exemplary radio communication system 5 including two radio units 10 and 20 that are coupled by a single cable 30 according to some embodiments of the present application.

In this example, an antenna 25 of the radio communication system 5 receives a radio frequency (RF) signal including both the vertically polarized microwave and horizontally polarized microwave, which is transmitted from another radio communication system (not shown in the figure). An Orthomode Transducer (OMT) 15 splits the RF signal into two components, a vertically polarized RF signal for the first radio unit 10 and a horizontally polarized RF signal for the second radio unit 20. In some embodiments, the OMT 15 can be replaced with a polarization duplexer. Note that the two radio units 10 and 20 operate in substantially the same manner except for the difference in the polarization of the two RF radio signals. For illustrative purposes, the following description primarily focuses on the first radio unit 10. But it will be apparent for one skilled in the art to understand how the second radio unit 20 operates based on the description therein.

In the first radio unit 10, a downconverter 10-1 converts the incoming vertically polarized RF signal into a vertically polarized intermediate frequency (IF) signal. As shown in FIG. 1, a first IQ demodulator 10-2 in the first radio unit 10 splits the vertically polarized IF signal into a vertically polarized I-component baseband signal and a vertically polarized Q-component baseband signal. The two outputs of the first IQ demodulator 10-2 are provided to a first analog-to-digital (A/D) converter 10-3, which converts the vertically polarized I-component baseband signal and the vertically polarized Q-component baseband signal into a first digital signal. A first radio processor 10-4 (e.g., a baseband radio processor) in the first radio unit 10 processes the first digital signal and converts it into a pre-XPIC digital signal.

As noted above, the cable 30 couples the first radio unit 10 to the second radio unit 20. More specifically, FIG. 1 depicts that the cable 30 includes multiple mutually insulated conductors serving as interconnections for coupling the two radio units. For example, an interconnection 30-1 in the cable 30 couples the output of the downconverter 10-1 in the first radio unit 10 to the input of an IQ demodulator 20-6 in the second radio unit 20. An interconnection 30-2 in the cable 30 couples the output of a downconverter 20-1 in the second radio unit 20 to the input of a second IQ demodulator 10-6 in the first radio unit 10. In particular, the input signal to the second IQ demodulator 10-6 is a horizontally polarized IF signal generated by the downconverter 20-1 from the horizontally polarized RF signal provided by the OMT 15. As noted below, the horizontally polarized IF signal is a reference signal used by the first radio unit 10 for cancelling XPI in the vertically polarized IF signal. To achieve this goal, the second IQ demodulator 10-6 splits the horizontally polarized IF signal into a horizontally polarized I-component baseband signal and a horizontally polarized Q-component baseband signal, respectively. Next, a second A/D converter 10-7 in the first radio unit 10 converts the horizontally polarized I-component baseband signal and the horizontally polarized Q-component baseband signal into a second digital signal. A first XPIC module 10-8 in the first radio unit 10 converts the second digital signal into a first reference signal. Finally, a digital combiner 10-48 in the first radio unit 10 combines the first reference signal from the first XPIC module 10-8 and the pre-XPIC digital signal from the first radio processor 10-4 into a post-XPIC digital signal. A digital demapper 10-5 in the first radio unit 10 then converts the post-XPIC digital signal into a digital output of the first radio unit 10, which carries the data to be provided to user equipment.

Note that some or all of the components in the first radio unit 10 may be in the form of individual components as shown in FIG. 1 or integrated into one single component. For example, the first radio processor 10-4 and the first XPIC module 10-8 may take the form of one unit, e.g., a baseband radio processor that has the XPIC capability.

In addition, FIG. 1 depicts that the interconnection 30-1 couples the output of the downconverter 10-1 in the first radio unit 10 to the input of the second IQ demodulator 20-6 in the second radio unit 20. Therefore, the input signal to the second IQ demodulator 20-6 is a vertically polarized IF signal generated by the downconverter 10-1 from the vertically polarized RF signal provided by the OMT 15. The second radio unit 20 uses this vertically polarized IF signal as a reference signal to cancel XPI in the horizontally polarized IF signal.

Figure 2A:
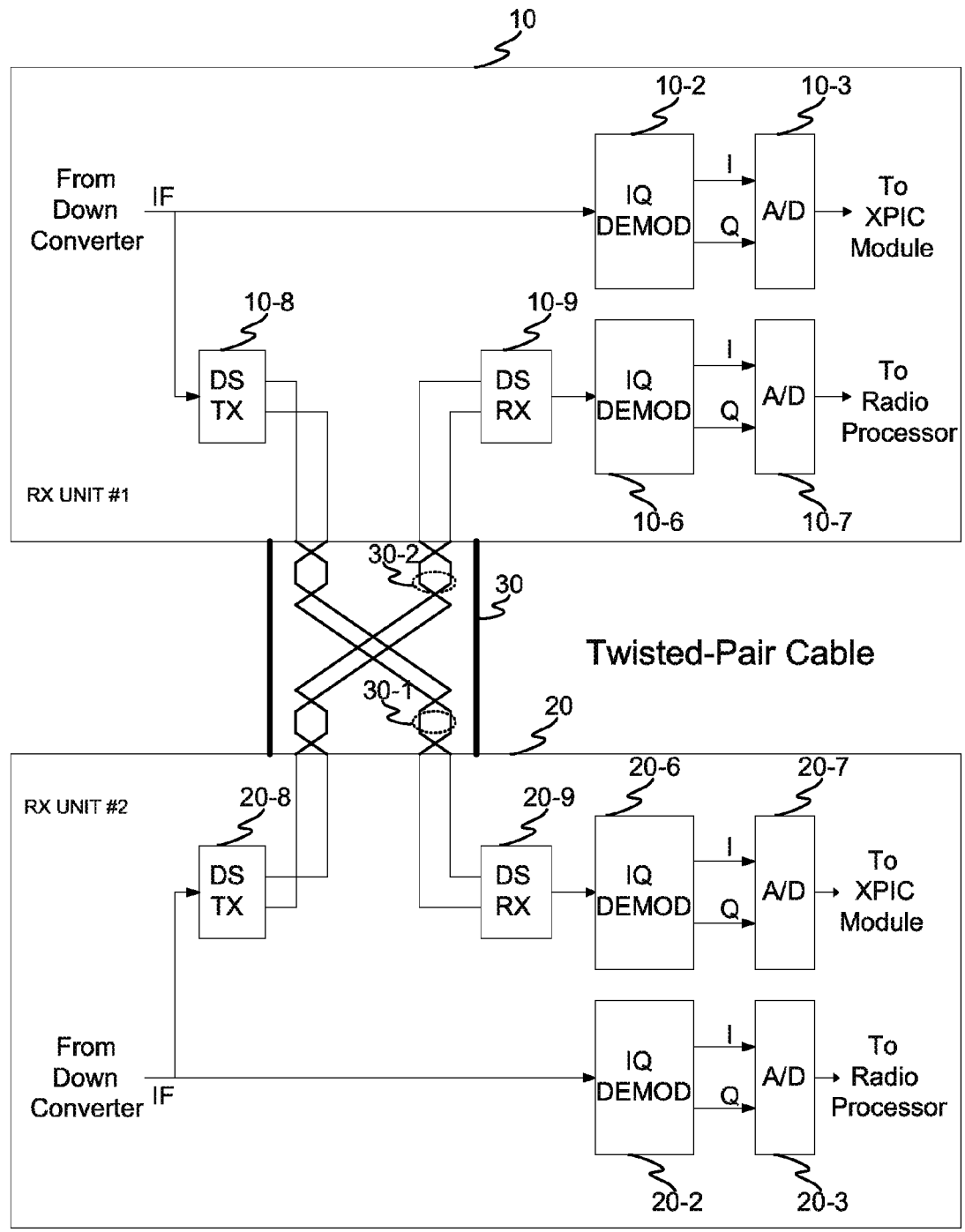
FIG. 2A is a schematic diagram of the two radio units being coupled by a single cable including two twisted-pairs of wires according to one embodiment of the present invention.

FIG. 2A is a schematic diagram of two radio units 10 and 20 being coupled together by a single cable including two twisted-pairs of wires according to one embodiment of the present invention. For illustrative purposes, certain components (e.g., the downconverter, the XPIC module, the radio processor, etc.) in the two radio units 10 and 20 are skipped in this figure in order to focus on the operation of the cable 30. In this example, the cable 30 includes two twist-pairs of wires identified as the interconnections 30-1 and 30-2, each transmitting a reference signal from one radio unit to the other radio unit; respectively.

Figure 4A:
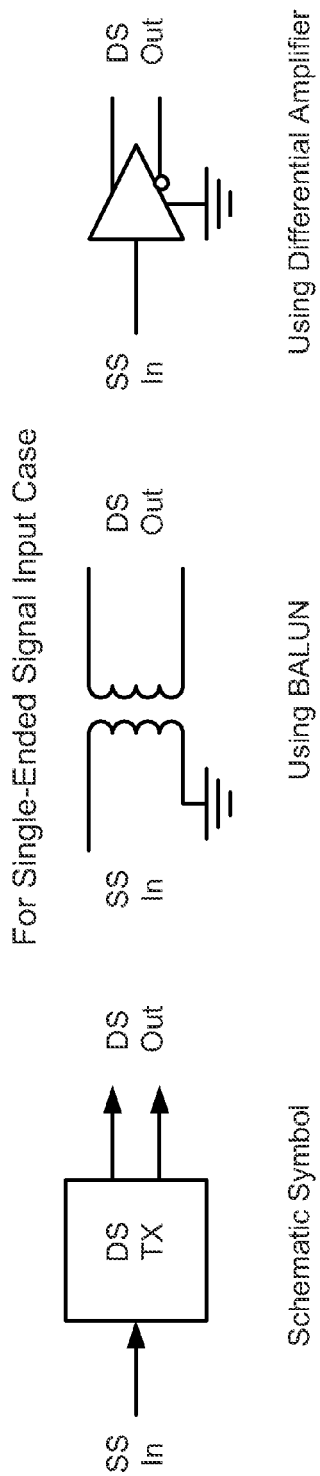
FIGS. 4A to 4C are schematic diagrams of exemplary transmitting modules and receiving modules used in the two radio units according to some embodiments of the present invention.
Figure 4B:
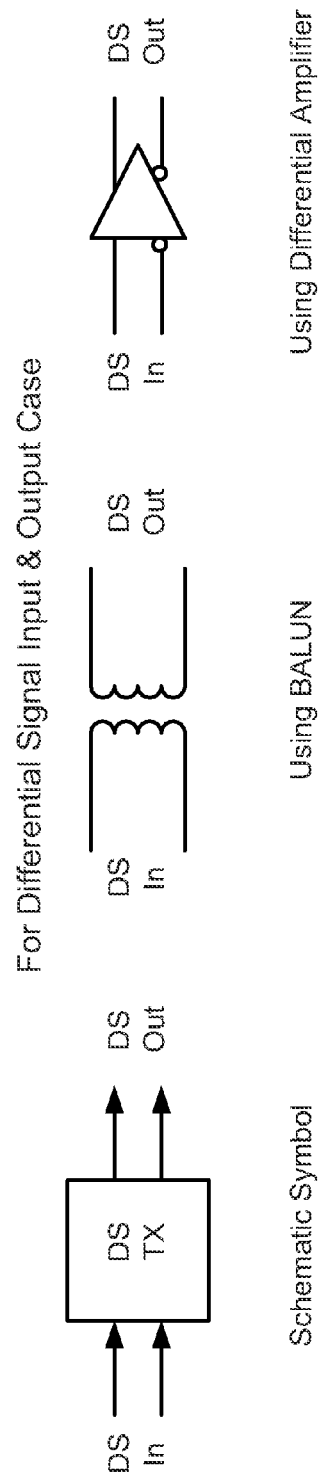
Figure 4C:
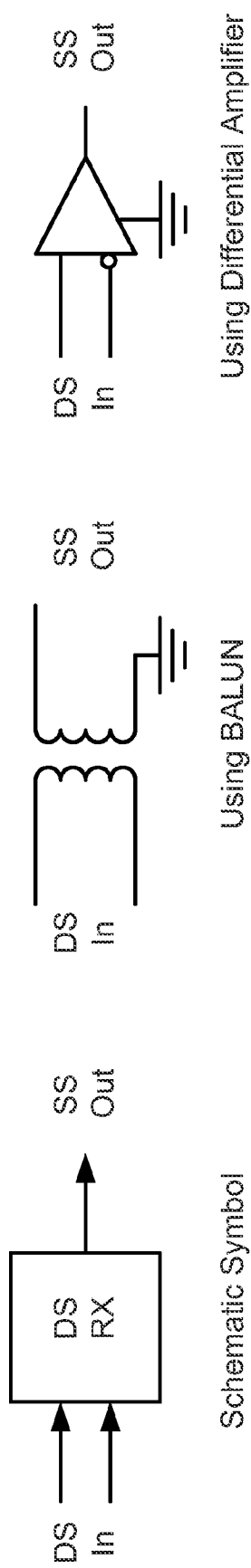

Using the first radio unit 10 as an example, the vertically polarized IF signal from the downconverter is provided to a transmitting module 10-8 having a single-ended signal input and two outputs. FIG. 4A depicts two embodiments of the transmitting module 10-8 having a single-ended signal input and two outputs, one being an electrical transformer (e.g., BALUN) and the other being a differential amplifier with one input terminal being grounded. The outputs of the transmitting module 10-8 reach the two input terminals of a receiving module 20-9 in the second radio unit 20 through one twisted-pair of wires 30-1. In this example, the receiving module 20-9 has two inputs and a single-ended signal output. FIG. 4C depicts two embodiments of the receiving module 20-9, one being an electrical transformer (e.g., BALUN) with one output terminal being grounded and the other being a differential amplifier.

Within the second radio unit 20, the second IQ demodulator 20-6 receives the output of the receiving module 20-9, i.e., a vertically polarized IF signal, and converts the vertically polarized IF signal into a vertically polarized I-component baseband signal and a vertically polarized Q-component baseband signal, respectively. A first IQ demodulator 20-2 in the second radio unit 20 converts the horizontally polarized IF signal (in the form of two differential signals) into a horizontally polarized I-component baseband signal and a horizontally polarized Q-component baseband signal, respectively. Next, a first A/D converter 20-3 in the second radio unit 20 converts the horizontally polarized I-component baseband signal and the horizontally polarized Q-component baseband signal into a first digital signal, which is then converted by the second radio processor 20-4 shown in FIG. 1 into a pre-XPIC digital signal. A second A/D converter 20-7 in the second radio unit 20 converts the vertically polarized I-component baseband signal and the vertically polarized Q-component baseband signal into a second digital signal, which is then converted by the second XPIC module 20-8 shown in FIG. 1 into the second reference signal.

Figure 2B:
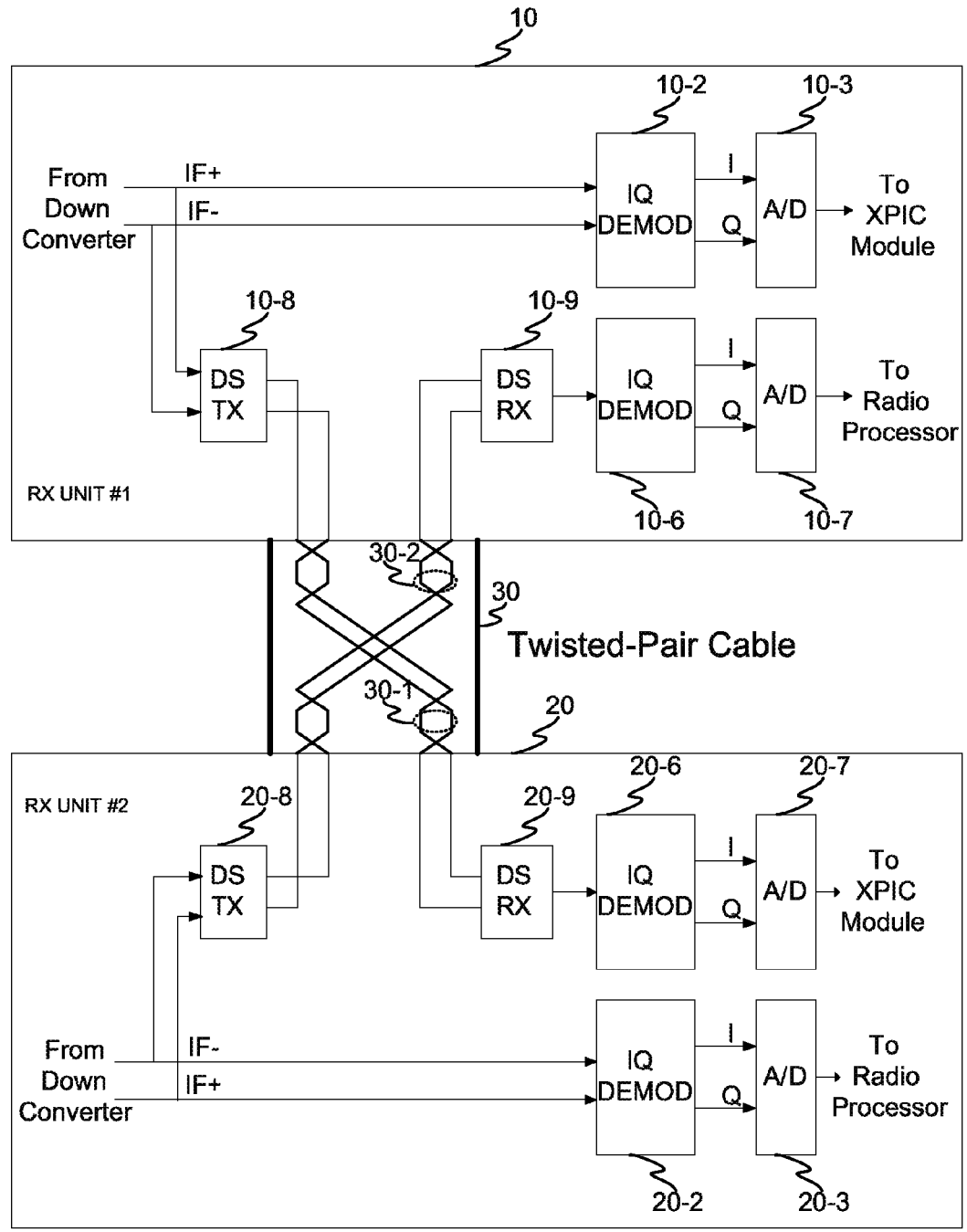
FIG. 2B is a schematic diagram of the two radio units being coupled by a single cable including two twisted-pairs of wires according to another embodiment of the present invention.

FIG. 2B is a schematic diagram of two radio units that are coupled by a single cable including two twisted-pairs of wires according to another embodiment of the present invention. Note that this embodiment is substantially similar to the one shown in FIG. 2A. One difference between the two embodiments is that the transmitting modules 10-8 and 20-8 in FIG. 2B have two input terminals and two output terminals to support differential input and output signals, respectively. Exemplary embodiments of the transmitting modules 10-8 and 20-8 in FIG. 2B are shown in FIG. 4B.

Figure 3A:
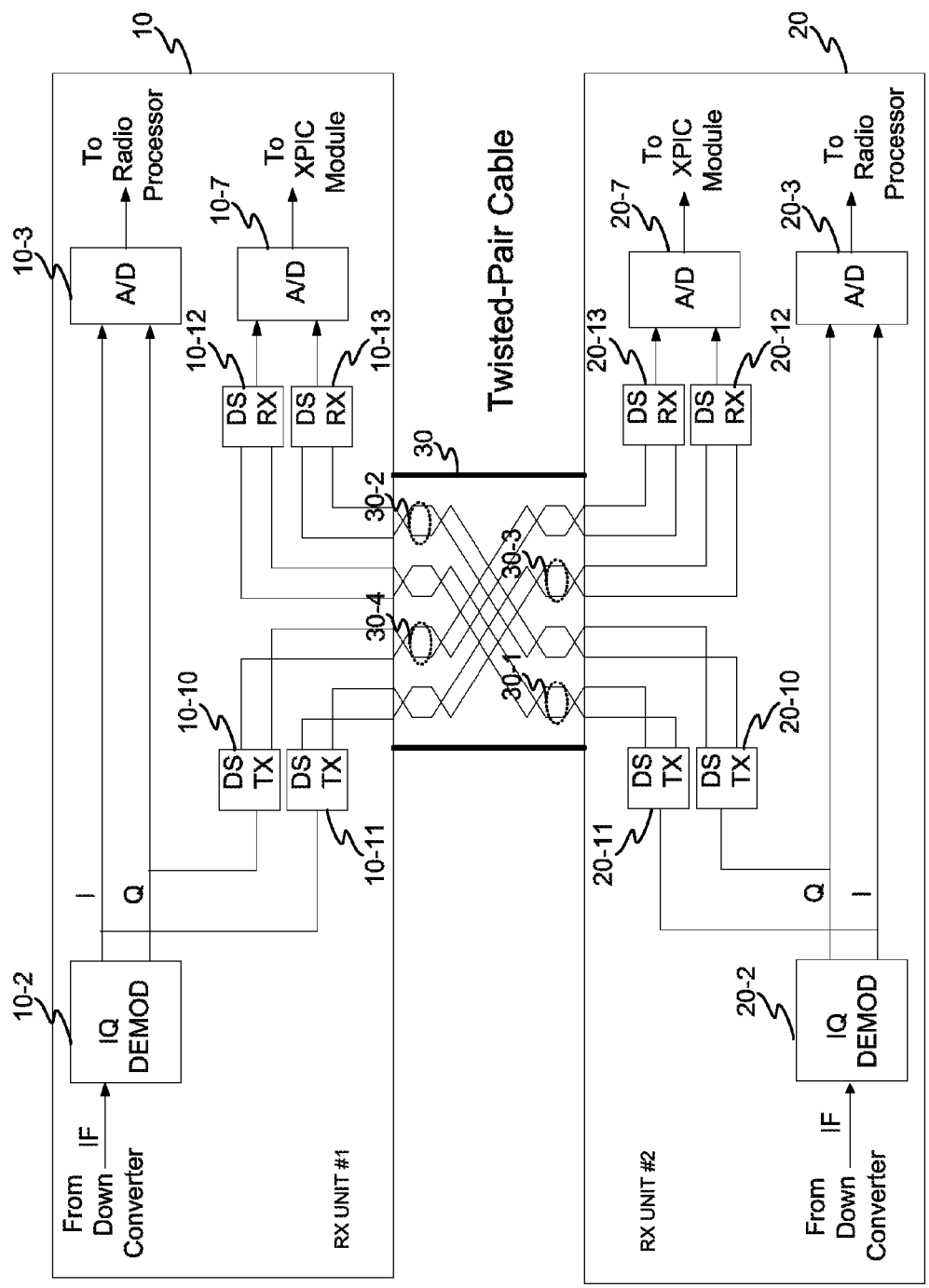
FIG. 3A is a schematic diagram of the two radio units being coupled by a single cable including four twisted-pairs of wires according to one embodiment of the present invention.

FIG. 3A is a schematic diagram of the two radio units that are coupled by a single cable including four twisted-pairs of wires according to one embodiment of the present invention. Note that this embodiment is similar to the one shown in FIG. 2A. One difference between the two embodiments is that the two IQ demodulators 10-2 and 10-6 in the first radio unit 10 shown in FIG. 2A are replaced by a single IQ demodulator 10-2 in the first radio unit 10 as shown in FIG. 3A. The IQ demodulator 10-2 receives the vertically polarized IF signal from the first downconverter 10-1 (not shown in FIG. 3A) and converts it into a vertically polarized I-component baseband signal and a vertically polarized Q-component baseband signal, respectively. Next, the vertically polarized I-component baseband signal and the vertically polarized Q-component baseband signal are provided to respective transmitting modules 10-10 and 10-11. The outputs of the two transmitting modules 10-10 and 10-11 are transmitted to respective receiving modules 20-13 and 20-12 in the second radio unit 20 through two twisted-pairs of wires 30-4 and 30-3 in the cable 30.

With the replacement of the IF signal with the I-component and Q-component baseband signals as the reference signal in the first radio unit 10, there is no need for the other IQ demodulator 10-6 in the first radio unit 10. Similarly, the replacement of the IF signal with the I-component and Q-component baseband signals as the reference signal in the second radio unit 20 renders the other IQ demodulator 20-6 in the second radio unit 20 redundant. At the same time, the number of twisted-pairs of wires in the cable 30 doubles from two in FIG. 2A to four in FIG. 3A. The generation of the reference signal and the cancellation of the XPI using the reference signal in each radio unit are substantially the same between the embodiment shown in FIG. 2A and the embodiment shown in FIG. 3A.

For example, as shown in FIG. 1, the first A/D converter 10-3 converts the vertically polarized I-component baseband signal and the vertically polarized Q-component baseband signal into a first digital signal. The first radio processor 10-4 in the first radio unit 10 converts the first digital signal into a pre-XPIC digital signal. The second A/D converter 10-7 converts the horizontally polarized I-component baseband signal and the horizontally polarized Q-component baseband signal into a second digital signal. The first XPIC module 10-8 in the first radio unit 10 converts the second digital signal into the first reference signal. The digital combiner 10-48 combines the first reference signal and the pre-XPIC digital signal into a post-XPIC digital signal and the digital demapper 10-5 then converts the post-XPIC digital signal into a digital output of the first radio unit 10.

Figure 3B:
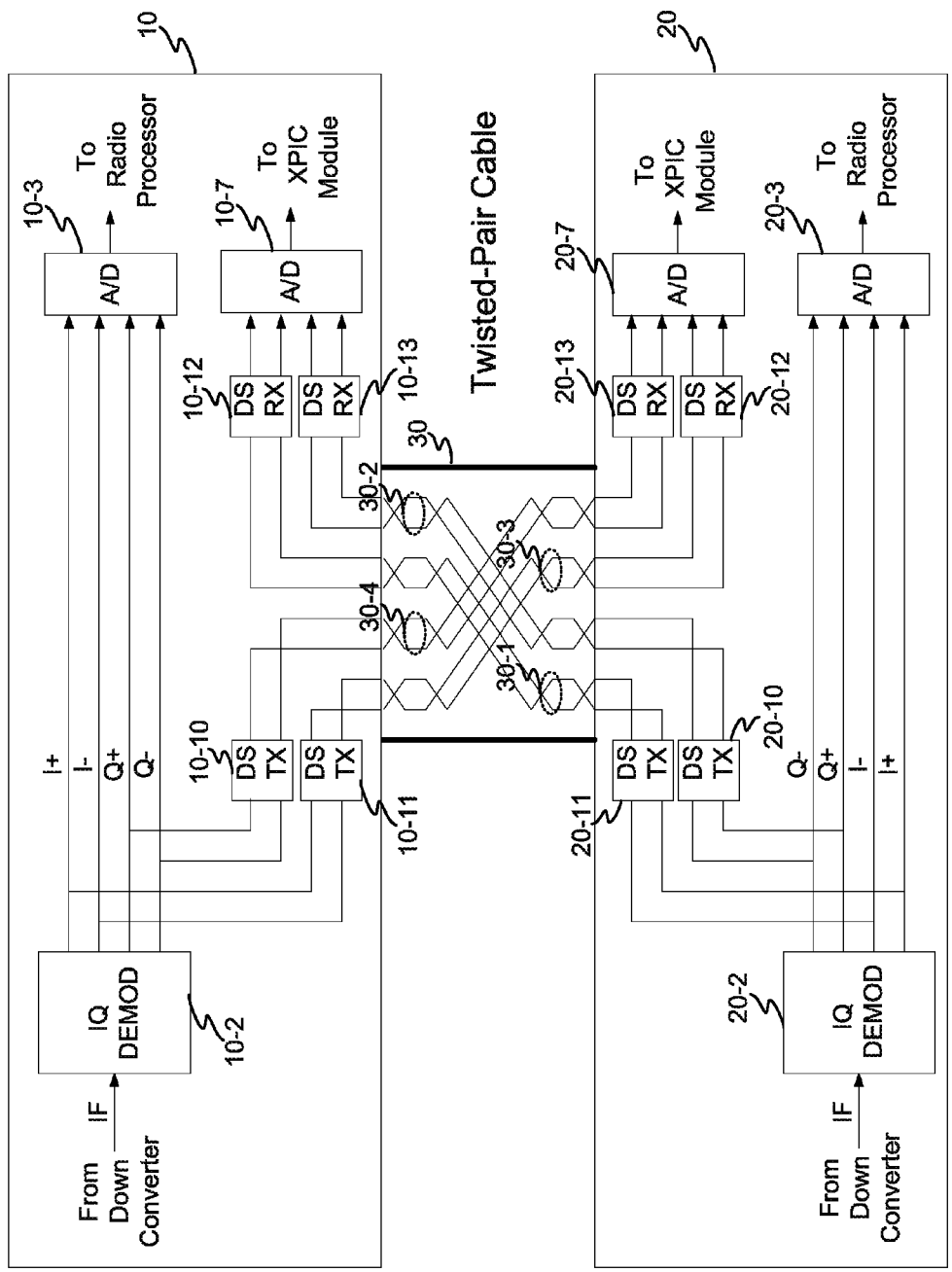
FIG. 3B is a schematic diagram of the two radio units being coupled by a single cable including four twisted-pairs of wires according to another embodiment of the present invention.

FIG. 3B is a schematic diagram of the two radio units that are coupled by a single cable including four twisted-pairs of wires according to another embodiment of the present invention. Note that this embodiment is similar to the one shown in FIG. 3A. One difference between the two embodiments is that the transmitting modules 10-10, 10-11, 20-10, and 20-11 in FIG. 3B have two input terminals and two output terminals to support differential input and output signals, respectively. Exemplary embodiments of the transmitting modules 10-10, 10-11, 20-10, and 20-11 in FIG. 3B are shown in FIG. 4B.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An outdoor radio communication system, comprising:
a first radio unit, wherein the first radio unit includes a first downconverter, a first radio processor that is communicatively coupled to the first downconverter, and a first XPIC module;
a second radio unit, wherein the second radio unit includes a second downconverter, a second radio processor that is communicatively coupled to the second downconverter, and a second XPIC module; and
a single cable coupling the first radio unit to the second radio unit, wherein the single cable further includes:
a first twisted-pair of wires for communicatively coupling the first downconverter to the second XPIC module and
a second twisted-pair of wires for communicatively coupling the second downconverter to the first XPIC module,
wherein:
the first XPIC module is configured to generate a first reference signal using a signal from the second downconverter to cancel cross-polarization interference in an output signal of the first radio processor, and
the second XPIC module is configured to generate a second reference signal using a signal from the first downconverter to cancel cross-polarization interference in an output signal of the second radio processor.

2. The radio communication system of claim 1, further comprising:
an orthomode transducer that is coupled to the first radio unit and the second radio unit, respectively, wherein the orthomode transducer is configured to split a RF signal into a vertically polarized RF signal for the first radio unit and a horizontally polarized RF signal for the second radio unit.

3. The radio communication system of claim 2, wherein the first downconverter is configured to convert the vertically polarized RF signal into a vertically polarized IF signal and the second downconverter is configured to convert the horizontally polarized RF signal into a horizontally polarized IF signal, respectively.

4. The radio communication system of claim 3, wherein the second radio unit further includes:
   a first IQ demodulator for converting the horizontally polarized IF signal into a horizontally polarized I-component baseband signal and a horizontally polarized Q-component baseband signal; and
   a second IQ demodulator for receiving the vertically polarized IF signal from the first downconverter through the first twisted-pair of wires and converting the vertically polarized IF signal into a vertically polarized I-component baseband signal and a vertically polarized Q-component baseband signal, respectively.

5. The radio communication system of claim 4, wherein the second radio unit further includes:
   a first analog-to-digital converter for converting the horizontally polarized I-component baseband signal and the horizontally polarized Q-component baseband signal into a first digital signal, wherein the second radio processor is configured to convert the first digital signal into a pre-XPIC digital signal; and
   a second analog-to-digital converter for converting the vertically polarized I-component baseband signal and the vertically polarized Q-component baseband signal into a second digital signal, wherein the second XPIC module is configured to convert the second digital signal into the second reference signal.

6. The radio communication system of claim 5, wherein the second radio unit further includes:
   a digital combiner for combining the second reference signal and the pre-XPIC digital signal into a post-XPIC digital signal; and
   a digital demapper for converting the post-XPIC digital signal into a digital output of the second radio unit.

7. The radio communication system of claim 3, wherein the first radio unit further includes:
   a third IQ demodulator for receiving the horizontally polarized IF signal from the second downconverter through the second twisted-pair of wires and converting the horizontally polarized IF signal into a horizontally polarized I-component baseband signal and a horizontally polarized Q-component baseband signal, respectively; and
   a fourth IQ demodulator for converting the vertically polarized IF signal into a vertically polarized I-component baseband signal and a vertically polarized Q-component baseband signal, respectively.

8. The radio communication system of claim 7, wherein the first radio unit further includes:
   a third analog-to-digital converter for converting the horizontally polarized I-component baseband signal and the horizontally polarized Q-component baseband signal into a third digital signal, wherein the first XPIC module is configured to convert the third digital signal into the first reference signal; and
   a fourth analog-to-digital converter for converting the vertically polarized I-component baseband signal and the vertically polarized Q-component baseband signal into a fourth digital signal, wherein the first radio processor is configured to convert the fourth digital signal into a pre-XPIC digital signal.

9. The radio communication system of claim 8, wherein the first radio unit further includes:
   a digital combiner for combining the first reference signal and the pre-XPIC digital signal into a post-XPIC digital signal; and
   a digital demapper for converting the post-XPIC digital signal into a digital output of the first radio unit.

10. An outdoor radio communication system, comprising:
    a first radio unit, wherein the first radio unit includes a first downconverter, a first IQ demodulator that is communicatively coupled to the first downconverter, a first radio processor that is communicatively coupled to the first IQ demodulator, and a first XPIC module;
    a second radio unit, wherein the second radio unit includes a second downconverter, a second IQ demodulator that is communicatively coupled to the second downconverter, a second radio processor that is communicatively coupled to the second IQ demodulator, and a second XPIC module; and
    a single cable coupling the first radio unit to the second radio unit, wherein the single cable includes:
       first and second twisted-pairs of wires for communicatively coupling the first IQ demodulator to the second XPIC module and
       third and fourth twisted-pairs of wires for communicatively coupling the second IQ demodulator to the first XPIC module,
    wherein:
       the first XPIC module is configured to generate a first reference signal using a signal from the second downconverter to cancel cross-polarization interference in an output signal of the first radio processor, and
       the second XPIC module is configured to generate a second reference signal using a signal from the first downconverter to cancel cross-polarization interference in an output signal of the second radio processor.

11. The radio communication system of claim 10, further comprising:
    an orthomode transducer that is coupled to the first radio unit and the second radio unit, respectively, wherein the orthomode transducer is configured to split a RF signal into a vertically polarized RF signal for the first radio unit and a horizontally polarized RF signal for the second radio unit.

12. The radio communication system of claim 11, wherein the first downconverter is configured to convert the vertically polarized RF signal into a vertically polarized IF signal and the second downconverter is configured to convert the horizontally polarized RF signal into a horizontally polarized IF signal, respectively.

13. The radio communication system of claim 12, wherein the first radio unit further includes a first IQ demodulator for converting the vertically polarized IF signal into a vertically polarized I-component baseband signal and a vertically polarized Q-component baseband signal, respectively.

14. The radio communication system of claim 13, wherein the vertically polarized I-component baseband signal and the vertically polarized Q-component baseband signal are transmitted to the second radio unit through the first and second twisted-pairs of wires, respectively.

15. The radio communication system of claim 14, wherein the second radio unit further includes a second IQ demodulator for converting the horizontally polarized IF signal into a horizontally polarized I-component baseband signal and a horizontally polarized Q-component baseband signal, respectively.

16. The radio communication system of claim 15, wherein the horizontally polarized I-component baseband signal and the horizontally polarized Q-component baseband signal are transmitted to the first radio unit through the third and fourth twisted-pairs of wires, respectively.

17. The radio communication system of claim 16, wherein the first radio unit further includes:
   a first analog-to-digital converter for converting the vertically polarized I-component baseband signal and the vertically polarized Q-component baseband signal into a first digital signal, wherein the first radio processor is configured to convert the first digital signal into a pre-XPIC digital signal; and
   a second analog-to-digital converter for converting the horizontally polarized I-component baseband signal and the horizontally polarized Q-component baseband signal into a second digital signal, wherein the first XPIC module is configured to convert the second digital signal into the first reference signal.

18. The radio communication system of claim 17, wherein the first radio unit further includes:
   a digital combiner for combining the first reference signal and the pre-XPIC digital signal into a post-XPIC digital signal; and
   a digital demapper for converting the post-XPIC digital signal into a digital output of the first radio unit.

19. The radio communication system of claim 16, wherein the second radio unit further includes:
   a third analog-to-digital converter for converting the vertically polarized I-component baseband signal and the vertically polarized Q-component baseband signal into a third digital signal, wherein the second XPIC module is configured to convert the third digital signal into the second reference signal; and
   a fourth analog-to-digital converter for converting the horizontally polarized I-component baseband signal and the horizontally polarized Q-component baseband signal into a fourth digital signal, wherein the second radio processor is configured to convert the fourth digital signal into a pre-XPIC digital signal.

20. The radio communication system of claim 19, wherein the second radio unit further includes:
   a digital combiner for combining the second reference signal and the pre-XPIC digital signal into a post-XPIC digital signal; and
   a digital demapper for converting the post-XPIC digital signal into a digital output of the second radio unit.

* * * * *